(12) United States Patent
Andrei et al.

(10) Patent No.: US 11,468,375 B2
(45) Date of Patent: Oct. 11, 2022

(54) SYSTEM FOR ENERGY CONSUMPTION PREDICTION

(71) Applicant: BRITISH GAS TRADING LIMITED, Windsor (GB)

(72) Inventors: Adi Andrei, London (GB); Jim Anning, Berkshire (GB); Stephen Wood, London (GB); Oliver Parson, London (GB); Miroslav Hamouz, Cambridge (GB)

(73) Assignee: BRITISH GAS TRADING LIMITED, Windsor Birkshire (GB)

( * ) Notice: Subject to any disclaimer, the term of this patent is extended or adjusted under 35 U.S.C. 154(b) by 1161 days.

(21) Appl. No.: 15/767,770

(22) PCT Filed: Oct. 12, 2016

(86) PCT No.: PCT/GB2016/053165
§ 371 (c)(1),
(2) Date: Apr. 12, 2018

(87) PCT Pub. No.: WO2017/064486
PCT Pub. Date: Apr. 20, 2017

(65) Prior Publication Data
US 2018/0285788 A1    Oct. 4, 2018

(30) Foreign Application Priority Data
Oct. 13, 2015 (GB) ..................................... 1518056

(51) Int. Cl.
*G06Q 10/04* (2012.01)
*G06N 20/00* (2019.01)
(Continued)

(52) U.S. Cl.
CPC ........... *G06Q 10/04* (2013.01); *G06F 16/287* (2019.01); *G06N 7/00* (2013.01); *G06N 20/00* (2019.01);
(Continued)

(58) Field of Classification Search
CPC .... G06Q 10/04; G06Q 30/0202; G06Q 50/06; G06F 16/287; G06N 7/00; G06N 20/00; G06N 20/20
(Continued)

(56) References Cited

U.S. PATENT DOCUMENTS

2011/0060495 A1* 3/2011 Kono ................. G01C 21/3469
701/31.4
2013/0079938 A1* 3/2013 Lee ........................ G06Q 30/02
700/291
(Continued)

FOREIGN PATENT DOCUMENTS

CN      111179108 A  *  5/2020
GB      2492071 A      12/2012

OTHER PUBLICATIONS

Prof. Dr. Ir. P. Avgeriou, Prediction of Energy Consumption Using Historical Data and Twitter, 2014 (Year: 2014).*
(Continued)

*Primary Examiner* — Tarek Elchanti
(74) *Attorney, Agent, or Firm* — Tucker Ellis LLP; Michael G. Craig

(57) ABSTRACT

A computer-implemented method of generating predicted energy consumption data for a first energy consumer based on energy consumption data of a plurality of further energy consumers is disclosed. Prediction is based on a set of training samples, each training sample comprising predictor attribute data and energy consumption data for a respective one of the further energy consumers, as well as one or more
(Continued)

predictor attribute values for the first energy consumer. A predictive model is generated based on the training samples, the predictive model defining a relationship between values of predictor attributes and energy consumption data of the training samples. Predicted energy consumption data for the first energy consumer is then determined using the predictive model and the predictor attribute values. A method of clustering energy consumption profiles is also disclosed.

17 Claims, 15 Drawing Sheets

(51) Int. Cl.
*G06F 16/28* (2019.01)
*G06N 20/20* (2019.01)
*G06Q 30/02* (2012.01)
*G06N 7/00* (2006.01)
*G06Q 50/06* (2012.01)

(52) U.S. Cl.
CPC ......... *G06N 20/20* (2019.01); *G06Q 30/0202* (2013.01); *G06Q 50/06* (2013.01)

(58) Field of Classification Search
USPC ....... 705/45, 7.31; 703/2; 700/291; 701/31.4
See application file for complete search history.

(56) References Cited

U.S. PATENT DOCUMENTS

2015/0006123 A1* 1/2015 An ..................... G06Q 10/04
   703/2
2015/0112763 A1* 4/2015 Goldschneider ... G06Q 30/0202
   705/7.31

OTHER PUBLICATIONS

International Search Report and Written Opinion from corresponding International Application No. PCT/GB2016/053165, dated Nov. 23, 2016.

* cited by examiner

| ID | P1 Occupancy | P2 No. of bedrooms | P3 House type | P4 House Age (Band) | Cons. /kWh |
|---|---|---|---|---|---|
| 1 | 4 | 3 | A | A1 | 41 |
| 2 | 5 | 4 | B | A3 | 60 |
| 3 | 2 | 2 | A | A3 | 22 |
| 4 | 2 | 1 | C | A4 | 34 |
| X | 3 | 2 | D | A1 | ? |

| ID | P1 Occupancy | P2 No. of bedrooms | P3 House type | P4 House Age (Band) | C1 Heating | C2 Hot water | C3 Cooking | C4 Appl's | C5 Ent. Devices | C6 Lighting |
|---|---|---|---|---|---|---|---|---|---|---|
| 1 | 4 | 3 | A | A1 | 18% | 14% | 20% | 32% | 7% | 9% |
| 2 | 5 | 4 | B | A3 | 0% | 0% | 40% | 28% | 10% | 22% |
| 3 | 2 | 2 | A | A3 | 0 | 20% | 32% | 25% | 11% | 12% |
| 4 | 2 | 1 | C | A4 | 22% | 14% | 35% | 10% | 6% | 13% |
| X | 3 | 2 | D | A1 | ? | ? | ? | ? | ? | ? |

Fig. 7

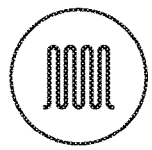 My Heating £ 40 - 50
View heating savings tips

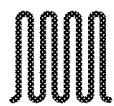 If you need to use a radiator then avoid putting the clothes directly on the radiator, which can make it work harder to provide the same level of heating ⊗ Close tips     View another heating tip >

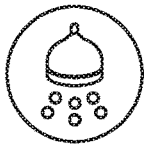 Hot water £ 15 - 25
View hot water savings tips

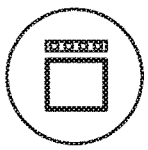 Cooking £ 10 - 15
View cooking savings tips

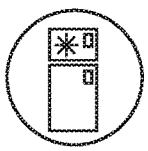 Appliances £ 30 - 45
View energy savings tips for appliances

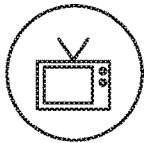 Entertainment £ 5 - 10
View energy savings tips for entertainment

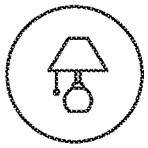 Lighting £ 2 - 7
View energy savings tips for entertainment

Results are based on
Your home profile

 1930's Semi detached

 4 Occupants

 3 Bedrooms

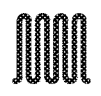 Gas Heating

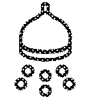 Electric hot water

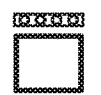 Gas & electric cooking

✎ edit your profile

Fig. 9

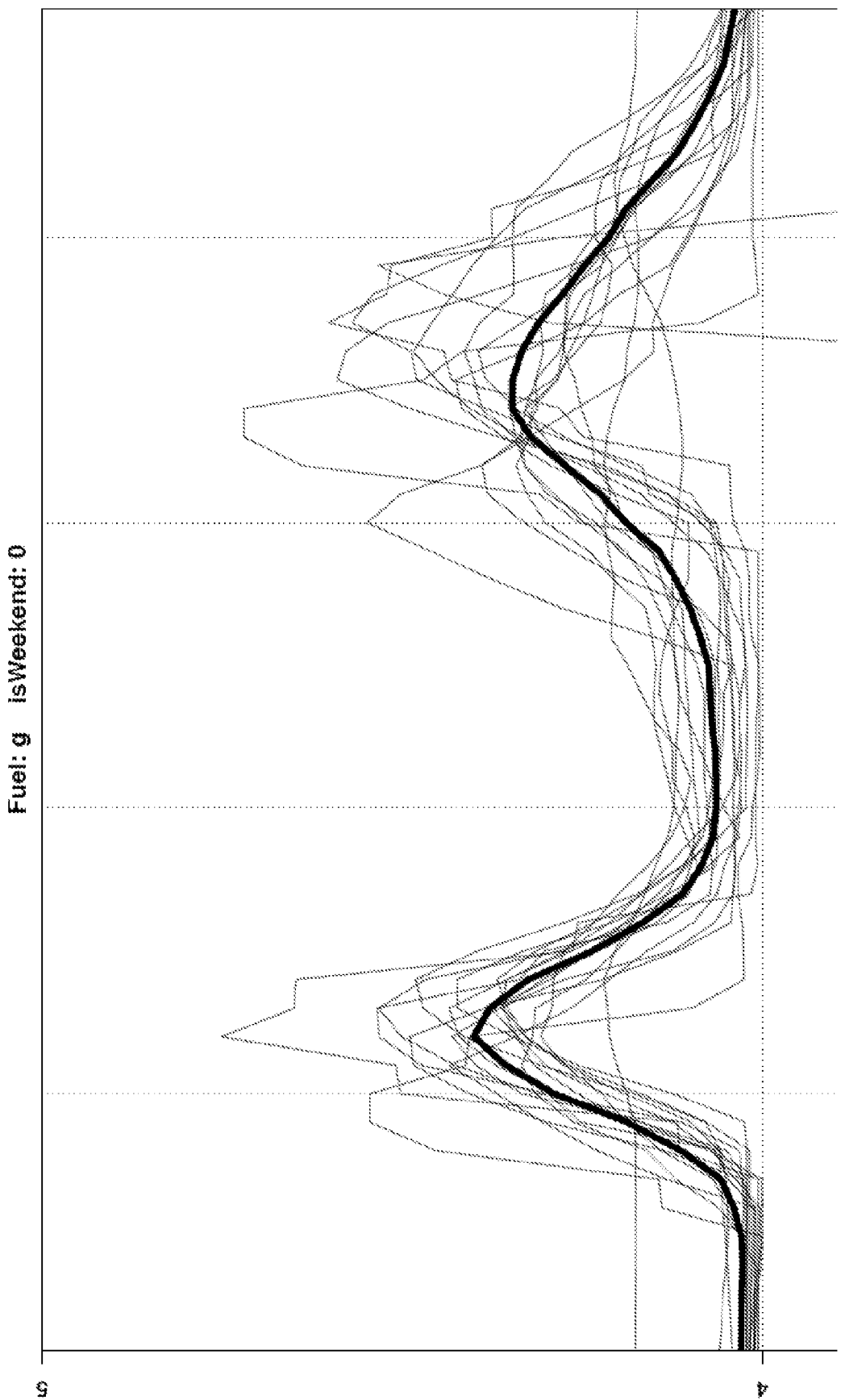

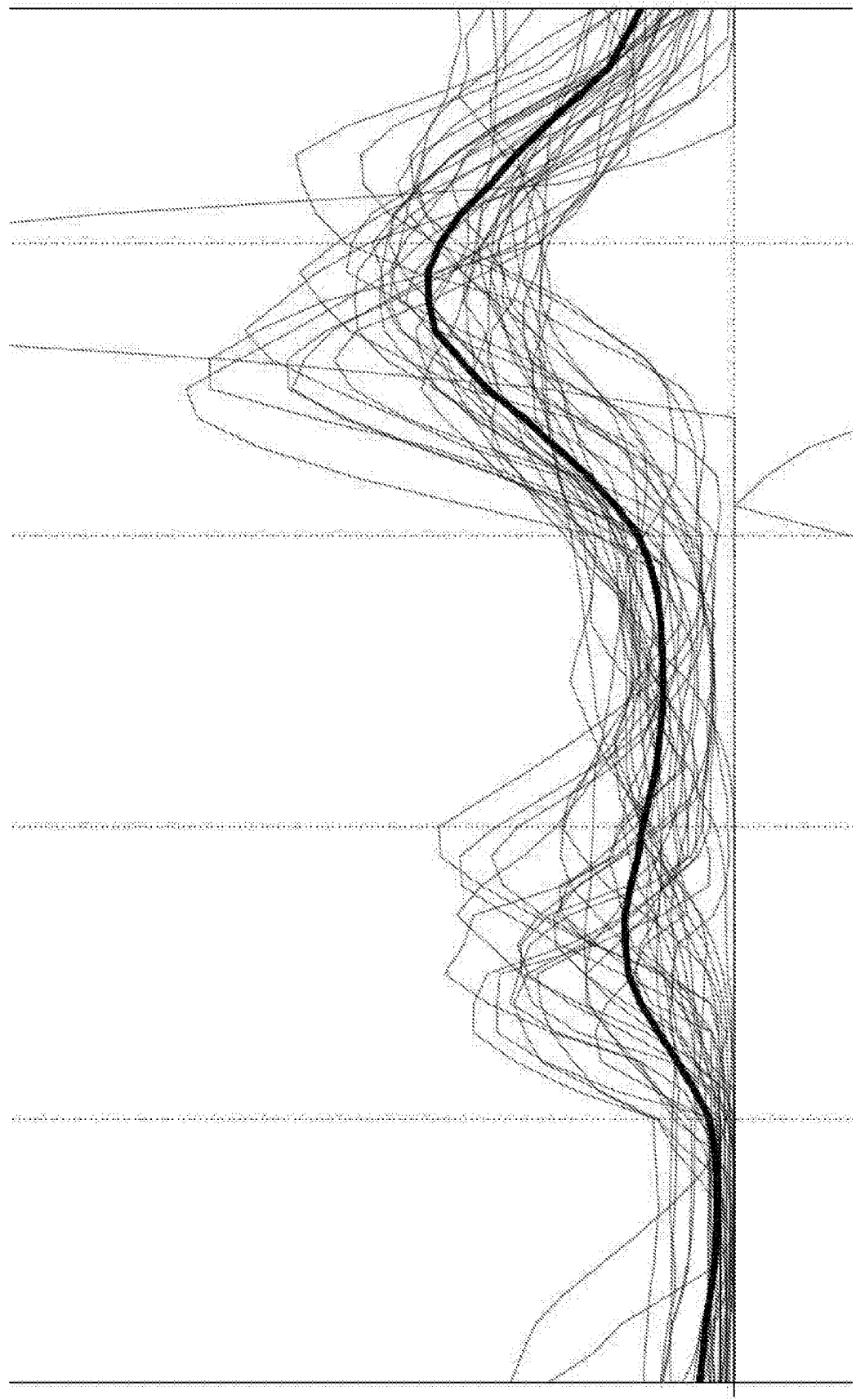

SYSTEM FOR ENERGY CONSUMPTION PREDICTION

CROSS-REFERENCE TO RELATED APPLICATIONS

This application claims priority to Great Britain Patent Application Serial No. 1518056.5 entitled SYSTEM FOR ENERGY CONSUMPTION PREDICTION, filed Oct. 13, 2015, which is incorporated herein by reference.

BACKGROUND

The present invention relates to systems and methods for processing energy consumption data and predicting energy consumption.

Energy efficiency is becoming increasingly important in view of environmental considerations as well as the rising cost of energy. In the domestic sphere there is an increasing drive to reduce energy consumption, e.g. by using more energy-efficient appliances, improving house insulation, and adjusting energy consumption behaviour. Availability of accurate and detailed information on energy consumption is key to achieving appreciable reductions in energy consumption. However, current domestic energy consumption metering generally provides only fairly coarse information on energy usage that is sufficient for billing purposes but does not allow detailed analysis or identification of opportunities for reducing consumption.

The present invention seeks to alleviate these problems, for example by providing methods for predicting energy consumption and analysing energy consumption profiles.

SUMMARY

Accordingly, in a first aspect of the invention, there is provided a computer-implemented method of generating predicted energy consumption data for a first energy consumer based on energy consumption data of a plurality of further energy consumers, comprising: accessing a set of training samples, each training sample comprising predictor attribute data and energy consumption data for a respective one of the further energy consumers; generating a predictive model based on the training samples, the predictive model defining a relationship between values of predictor attributes and energy consumption data of the training samples; receiving one or more predictor attribute values for the first energy consumer; determining predicted energy consumption data for the first energy consumer using the predictive model and the received predictor attribute values; and outputting the predicted energy consumption data.

Each training sample (in the set used for training) preferably comprises an energy consumption value indicating an amount of energy consumed by the respective energy consumer. The determining step preferably comprises generating a predicted energy consumption value for the first energy consumer indicating a predicted energy consumption by the first consumer. The training sample energy consumption values and/or predicted energy consumption value may specify a total energy consumption value, optionally for a given fuel type used by an energy consumer (e.g. gas/electricity) and/or for a given time period. Any suitable measure may be used to represent energy/fuel consumption, such kWh, $m^3$ (e.g. for gas). More generally, energy consumption may be expressed in terms of an amount of fuel consumed (e.g. by volume or weight), in physical terms such as Joules/Watts, in cost terms (e.g. in terms of a charge amount corresponding to an amount of fuel used), or in any other suitable way. The terms "energy consumption" and "fuel consumption" (which are used interchangeably herein unless required otherwise by context) shall be interpreted accordingly, and the term "energy" is used broadly and is not limited specifically to (though it may include) the physical energy quantity that is conventionally measured in units of Joules.

The training sample energy consumption values and/or predicted energy consumption data may specify energy consumption values relating to one or more consumption categories (e.g. instead of or in addition to overall/total energy consumption). More specifically, training samples may comprise consumption category values for energy consumption in each of a predetermined set of energy consumption categories, the category values preferably specifying a proportion of a total energy consumption value associated with the respective energy consumer that falls in the respective consumption category.

In that case, determining predicted energy consumption data may comprise generating predicted consumption category values for one or more, or preferably each, of the consumption categories, each predicted consumption category value preferably indicating a proportion of a total consumption predicted to fall within the respective consumption category. The method may then further comprise determining based on the proportional category values and an absolute total consumption value for the first energy consumer predicted absolute category consumption values for the first energy consumer for one or more of the categories (e.g. a proportional category value may be expressed as a percentage or other fractional value, and such a value may be multiplied by a known total consumption value to obtain an absolute value for the given category).

The method may comprise generating a respective predictive model for each consumption category, and determining each predicted consumption category value using the respective predictive model for the category.

The energy consumption categories may comprise categories indicating different classes of energy consuming devices. For example, categories may include one or more of: an environmental heating category (e.g. including consumption by central heating boilers, air or space heaters, gas fires and the like), an air conditioning/cooling category, a climate control category, a water heating category, a cooking category (e.g. for ovens, hobs and other cooking appliances), an appliances category (e.g. covering washing machines, dishwashers and other large domestic appliances), a lighting category and an entertainment device category (e.g. TVs, games consoles, Hi-Fi equipment, computers and the like). Note that a single appliance or device may be associated with multiple categories; for example a boiler may heat water both for central heating and for hot water supply.

Preferably, the method comprises computing energy cost data based on the predicted energy consumption data, preferably including respective energy cost values for each of the energy consumption categories. Energy cost data may be computed by applying a charge rate or tariff to the predicted energy consumption data (such a tariff may be a complex tariff, e.g. specifying different rates for different bands of consumption; for example usage up to a threshold may be charged at a first rate and usage above the threshold may be charged at a second rate).

Preferably, generating a predictive model comprises performing a regression analysis and/or applying a machine learning algorithm to the training samples.

Generating a predictive model may comprise generating one or more decision (or regression) trees based on the training samples, the one or more decision trees adapted to produce predicted energy consumption data based on one or more predictor attribute values of an unseen sample. More particularly, the step of generating a predictive model may comprise: generating a plurality of decision trees, each decision tree learnt from a subset of the data of the training samples, the data subset preferably determined by random selection of a set of samples from the training samples and/or by random selection of predictor attributes from predictor attributes of the training samples, generating a plurality of prediction outputs based on the plurality of decision trees; and generating the predicted energy consumption data based on the plurality of prediction outputs.

In a preferred approach, the step of generating a predictive model comprises applying a random forest learning algorithm to the training samples.

Regardless of the learning algorithm used, the method preferably comprises running the machine learning algorithm for each of a plurality of consumption categories, each iteration generating a respective category prediction model for the respective consumption category based on category consumption data for the respective category in the training samples, and generating predicted consumption data for each category using the generated category prediction models.

Preferably, predicted category consumption values generated for a plurality of consumption categories are then normalised, preferably so that the category consumption values sum to a predetermined total (optionally one).

The received predictor attribute values for the first energy consumer and/or the predictor attribute data of the training samples may comprise one or more of: a property type attribute; a property age attribute (e.g. expressed as a selection from a predefined set of age bands or as an absolute age value); a property size attribute, optionally indicating a number of rooms or a number of bedrooms of a residential property (alternatively or additionally an area value (e.g. floor space) may be used); and an occupancy attribute indicating a number of occupants of the property.

Accessing a set of training samples preferably comprises selecting the set of training samples from samples in the database based on one or more predetermined criteria. A predetermined number of training samples fulfilling the predetermined criteria may be selected. The training samples may be selected based on a geographic distance between energy consumers represented by the training samples and the first energy consumer, preferably by selecting a predetermined number of training samples of energy consumers that are geographically nearest the first energy consumer.

The method may comprise selecting training samples for energy consumers having a similar total energy consumption to the first energy consumer, preferably having a total energy consumption value within a predetermined threshold distance from a total energy consumption value of the first energy consumer.

The method may comprise generating predicted energy consumption data for each of a plurality of time periods and/or for each of a plurality of fuel types, optionally by repeating the model generating and prediction determining steps using respective sets of training samples for each of the time periods (e.g. days, weeks months etc.) and/or fuel types (e.g. gas and electricity).

Preferably, the outputting step comprises generating and outputting a comparison between predicted energy consumption data for the first energy consumer and actual energy consumption data for the first energy consumer, preferably in the form of a graphical representation (optionally a graph).

In a further aspect of the invention, there is provided a computer-implemented method of generating predicted energy consumption data for a first energy consumer based on energy consumption data of a plurality of further energy consumers, comprising: accessing a set of training samples in a database of consumption data, each training sample comprising predictor attribute data and energy consumption data for a respective one of the further energy consumers, the energy consumption data including respective category consumption values for a plurality of energy consumption categories; generating one or more predictive models based on the training samples, the predictive models defining relationships between values of predictor attributes and the category consumption values of the training samples; receiving one or more predictor attribute values for the first energy consumer; determining predicted energy consumption category values for the first energy consumer for each energy consumption category using the predictive model(s) and the received predictor attribute values; and outputting the predicted energy consumption category values. The method in this aspect may further comprise any of the further steps or features of a method as set out above in connection with the first aspect of the invention.

In a further aspect of the invention, there is provided a method of processing energy consumption data, comprising: receiving a plurality of energy consumption profiles, each profile comprising a time series of energy consumption data values; comparing profiles of the plurality of energy consumption profiles; and clustering the energy consumption profiles based on the comparison, the clustering comprising: determining a plurality of profile clusters; and assigning profiles to profile clusters. The method may then further comprise outputting data representative of the determined clustering, for example by outputting data defining assignments of profiles to clusters, outputting graphical representations of cluster assignments, outputting representative time series (e.g. medoid time series or averaged time series) for identified clusters (optionally as graphical time series representations), and the like. Graphical representations of time series data may be in the form of graphs, e.g. plotting individual data values of the time series against time.

The comparing step preferably comprises performing a correlation analysis for each of a plurality of pairs of energy consumption profiles. The method may comprise computing a comparison metric for each of a plurality of pairs of energy consumption profiles, the clustering step clustering energy consumption profiles based on the comparison metrics. The comparison metric may comprise a correlation/similarity measure or distance measure and/or indicates a degree of correlation or similarity (or conversely dissimilarity) between profiles. Preferably, the comparison metric comprises (or is based on) a Pearson correlation measure computed between respective profiles.

Clustering is preferably performed using a k-medoids clustering algorithm, preferably based on partitioning around medoids (PAM).

The method preferably comprises determining a comparison metric for each distinct pairing of energy consumption profiles selected from the plurality of energy consumption profiles. Alternatively, the method may comprise determining comparison metrics for pairings of profiles selected from a subset of the profiles, performing the clustering for the subset of profiles using the associated determined comparison metrics, and assigning profiles not in the subset of profiles to clusters identified by the clustering step, preferably based on distance/correlation with the clusters.

Each energy consumption profile preferably corresponds to a given time period and comprises a time series of energy consumption data values, each data value relating to consumption during a respective time interval within the given time period. Preferably, each data value of a time series specifies a relative proportion of energy consumed during a respective time interval with respect to a total energy consumption during the time period represented by the consumption profile (alternatively data values could specify absolute consumption values for time intervals). The time period may be one of: a day, a week, a month, or a year. The time series data values are preferably provided at a temporal resolution of at most one hour, more preferably at most 30 minutes.

Each energy consumption profile is preferably associated with a respective energy consumer.

The term "energy consumer" as used throughout this disclosure (and in connection with any of the defined aspects of the invention) preferably denotes any kind of energy consuming entity whose energy consumption is to be investigated or analysed using the methods described. In the context of the disclosed methods, energy consumers are typically buildings (e.g. houses), or parts of buildings that are treated as units for the purpose of energy consumption measurements (e.g. flats/apartments, terraced houses, office units, floors of a building). Such buildings or building units are generally also referred to herein as "properties". Energy consumers may thus comprise any form of commercial or residential properties, dwellings or households. Energy consumers may also correspond to customers of an energy supplier (e.g. typically a particular residential property will be associated with a particular energy supplier customer, who is generally an occupant of the property). However, the invention may also be more broadly applied to other contexts and other forms of energy consumers (e.g. "energy consumers" could represent individual appliances in a property, individual machines or production lines in a factory, individual vehicles in a vehicle fleet, and the like).

The invention also provides a system or apparatus having means, preferably in the form of a processor and associated memory, for performing a method as set out in any of above aspects (or as described elsewhere herein).

Thus, the invention further provides a system for generating predicted energy consumption data for a first energy consumer based on energy consumption data of a plurality of further energy consumers, comprising: means for storing a plurality of training samples, each training sample comprising predictor attribute data and energy consumption data for a respective one of the further energy consumers; means for generating a predictive model based on the training samples, the predictive model defining a relationship between values of predictor attributes and energy consumption data of the training samples; means for receiving one or more predictor attribute values for the first energy consumer; means for determining predicted energy consumption data for the first energy consumer using the predictive model and the received predictor attribute values; and means for outputting the predicted energy consumption data.

The invention further provides a system for generating predicted energy consumption data for a first energy consumer based on energy consumption data of a plurality of further energy consumers, comprising: means for accessing a set of training samples in a database of consumption data, each training sample comprising predictor attribute data and energy consumption data for a respective one of the further energy consumers, the energy consumption data including respective consumption category values for a plurality of energy consumption categories; means for generating one or more predictive models based on the training samples, the predictive models defining relationships between values of predictor attributes and the consumption category values of the training samples; means for receiving one or more predictor attribute values for the first energy consumer; means for determining predicted energy consumption category values for the first energy consumer for each energy consumption category using the predictive model(s) and the received predictor attribute values; and means for outputting the predicted energy consumption category values.

The invention further provides a system for processing energy consumption data, comprising: means for storing a plurality of energy consumption profiles, each profile comprising a time series of energy consumption data values; means for comparing profiles of the plurality of energy consumption profiles; and means for clustering the energy consumption profiles based on the comparison, the clustering means configured to: determine a plurality of profile clusters; and assign profiles to profile clusters.

The system in any of the above aspects may include means for performing a method as set out in any of the method aspects set out above (or as described elsewhere herein).

The invention further provides a computer readable medium or computer program product comprising software code adapted, when executed on a data processing apparatus, to perform any method as set out herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which:

FIG. 7 illustrates input data for a further prediction algorithm arranged to predict consumption in various energy consumption categories;

FIG. 9 illustrates output generated by the category prediction algorithm;

DETAILED DESCRIPTION

Embodiments of the invention provide systems and methods for analysing and predicting energy consumption. A first embodiment ("peer comparison") provides for generation of energy consumption predictions for a given energy consumer based on consumption data for other energy consumers (peers). A second embodiment ("breakdown prediction") provides for generation of a predicted breakdown of energy consumption into different consumption categories. A third embodiment ("profile clustering") provides for identification and analysis of different types of energy consumption behaviour.

Peer Comparison

The peer comparison algorithm generates a predicted or expected energy consumption value for a target property or household based on an analysis of relevant "peers", where peers are selected as other suitable properties or households which are in some sense similar to the target property in question and which are considered suitable for comparison.

Note that in the embodiments described herein, the analysis techniques are applied to energy consumption by residential energy users, and consumption is measured and analysed at the level of individual households or properties, where a household/property typically corresponds to a residential property such as a house or apartment. Each such property typically corresponds to a customer of an energy supplier.

However, the techniques can be applied to any appropriate energy consuming entities (e.g. commercial properties, facilities, factories and the like). Rather than representing commercial/residential properties, the energy consumers could also be subdivisions of properties or facilities (e.g. floors of a building), individual appliances or machines or any other entity for which energy consumption may be measured and analysed.

The term "property" as used herein may refer to any form of residential or commercial building or portion thereof or any other real estate entity, for which energy consumption can be individually determined. Since typical applications concern residential properties, the terms "property" and "household" are generally used interchangeably herein.

Figures 1, 2:
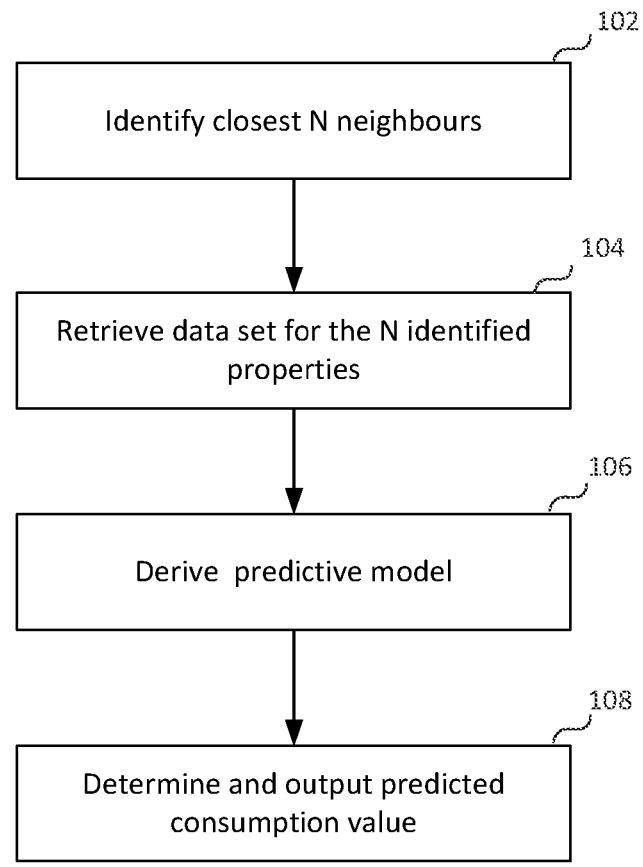
FIG. 1 illustrates a method for predicting energy consumption based on peer data.
FIG. 2 gives an example of input data provided to the prediction algorithm.

FIG. 1 illustrates the peer comparison algorithm in overview, as applied to energy consuming properties.

In step 102, a set of N peers of a target property are identified. In the present example, peers are selected based on geographic proximity, and the algorithm thus selects the N closest properties (neighbours) to the target property under consideration.

In step 104, data records including predictor attributes and consumption information for the N peers are retrieved from a database. The data records are used as training samples for the subsequent machine learning process.

In step 106 a predictive model is constructed based on the retrieved training samples, relating the predictor attributes to the consumption information.

In step 108, a predicted consumption value is determined for the target property using the predictive model, and is provided as output to a user.

The steps of the process are described in more detail below.

Peer Selection

In the present example, N nearest neighbours are selected as the peers for the peer comparison (here, "neighbours" simply refer to other properties that are geographically relatively close to the target property). The peers are selected from the properties for which consumption data is available in the database. For example, these may be customers of a particular energy supplier (and thus the peers represent the geographically closest customers of the energy supplier, rather than the closest properties per se).

However, alternative peering criteria may be used (such as selecting peer properties with similar house type or size), and multiple peering criteria may be combined (e.g. to select the nearest N properties of a given house type).

The database preferably stores location information specifying the geographic location of each property, for example as easting/northing (e.g. UTM) or longitude/latitude coordinates, or using any other suitable coordinate system or location specification. During peer selection, the system calculates the geographical (typically straight-line) distance to each property in the database from the target property under investigation, and then selects the N properties with the lowest distance values.

In a preferred embodiment N=200, though other values may be chosen based on requirements and available data. The value may also be configurable.

Training Samples

An example set of training data is shown in FIG. 2. Note that this is a simplified example provided for illustrative purposes.

In the depicted table, each of rows 1-4 represents one of the identified peer properties. The table includes an identifier column (ID), a number of predictor attribute columns (P1-P4) and at least one column of consumption data.

Each of the predictor attribute columns P1-P4 represents an attribute of a property used as a predictor by the algorithm.

In the present example, the predictors used are:

Occupancy. This specifies the number of people living at the property.

Number of bedrooms. This gives an indication of the size of the property. Other size indications could be additionally or alternatively be used, such as total number of rooms, floor area (e.g. in square metres/feet).

House type. Properties may be classified based on some predetermined classification scheme. For example, different classifications could be provided respectively for detached, semi-detached and terraced houses and for flats/apartments. In the present example each classification is represented by a classification code A-D in the table.

House age. In the present example the age of the property is classified in bands A1-A4 etc. (purely by way of example such bands could e.g. represent respective age ranges such as 0-10 years, 11-25 years, 26-50 years, and 51+ years). Alternatively an absolute age could be specified (e.g. in years).

The above predictors are used in a particular embodiment but are given by way of example. Other predictors could be used, in any appropriate combination.

The final column indicates a consumption value for the property. The consumption value in the present example indicates a daily average consumption for the property, in units of kWh. Other measures, such as monthly or annual consumption values may be used. Instead of a daily average, the consumption value could relate to a specific day (or other period).

The peer data including predictor attributes and consumption data is obtained from the database. The data records in the database may include additional information (e.g. location information such as easting/northing coordinates as previously described, additional predictor attributes or other information related to a property or its energy consumption). In one example, the set of predictors used may be selected from a set of available attributes in a configurable manner to alter the basis of the analysis.

Analysis

The analysis stage involves performing a regression analysis based on the selected data set, to derive a regression model indicating the relationships between the (independent) predictor variables and the (dependent) consumption variable.

The regression model is then used to predict a value for the consumption of the property under consideration based on the predictor attributes for that property.

In FIG. 2, the target property under consideration is denoted "X", in the final row of the table, and its predictor attributes are listed. The unknown (to-be-predicted) consumption value is indicated by a question mark.

In a preferred embodiment, the regression analysis is based on a form of decision tree learning known as a random forest algorithm.

The algorithm involves learning a set of decision trees based on the input data set. Since the aim is to predict a consumption value, the decision tree algorithm is a regression (rather than classification) algorithm (and thus the decision trees may also be referred to as regression trees). Attribute selection for each node of a decision tree (starting at the root) may be performed using a standard deviation reduction measure or other suitable measure. The sample set is then split based on values of the selected attribute and the process continues recursively at lower nodes in the tree. Leaf nodes represent averaged consumption values from a small number of samples (i.e. the average consumption of all the individuals in the category assigned by the tree for the property it tries to predict for), though in some case a leaf node could also represent a single consumption value if there is only a single input sample in the final classification. The leaf nodes provide the prediction outputs of the particular decision tree.

Each decision tree is learnt from a randomly restricted data set. In particular, each decision tree is restricted to a subset of the input rows (samples) and a subset of the predictor attributes (features).

By way of illustration, in the simplified example of FIG. 2 having samples corresponding to rows 1-4 with features corresponding to columns P1-P4, a first tree may be learnt based on rows 1, 2 and 4 using features P1, P2 and P3, while a second tree may be learnt based on rows 2, 3 and 4 using features P1, P3 and P4. It is not necessary for each tree to be based on the same number of samples or the same numbers of features. The subset of samples and features for each tree is selected randomly.

In a typical real-world example, the input data would include many more samples (as indicated above in one example 200 nearest properties are selected as input samples). In such an example, the number of trees learnt may be around 100, though the numbers may vary based on requirements and available data.

Each decision tree is trained on the selected sample set and feature set for that tree and the resulting tree is capable of outputting a prediction value when applied to a new, unseen sample.

Thus, after training of the multiple decision trees, the trees are each applied to the input sample X (specifically to its predictor attributes), producing a prediction for each tree. Since the trees are learnt from different data subsets, the individual trees generally differ and may thus produce different prediction values. A final predicted consumption value is then obtained based on the predicted values output by each tree. In a preferred embodiment, a mean prediction value of all decision tree outputs is taken. However, other methods may be used, for example a median value of the predictions may be used.

The combined predicted value is then provided as output.

Figure 3:
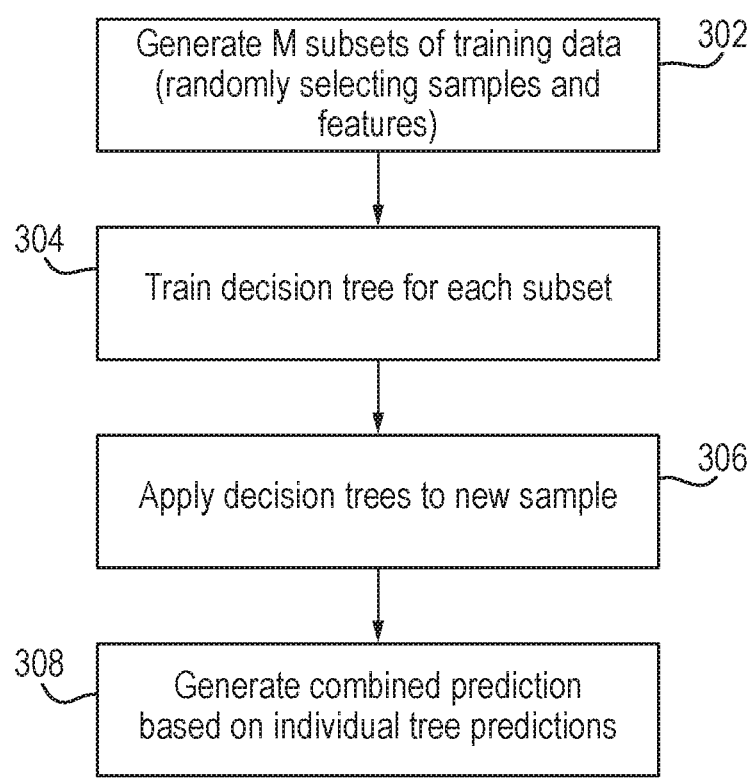
FIG. 3 illustrates a process for generating a predictive model.

The algorithm is summarised in FIG. 3. In step 302, M subsets of the source data are generated, with random selection of samples and features. In step 304, a decision tree for each data subset is trained, producing M decision trees. In step 306, the decision trees are applied to the predictor features of the new sample X, producing M prediction values. In step 308, the M prediction values are combined into a final prediction value, e.g. by averaging. Note that steps 302 and 304 are shown as separate for illustrative purposes, and in practice these may be implemented as a loop in which a data sample is selected and a decision tree learnt for that sample, before proceeding to the next sample. Furthermore, multiple decision trees may be learnt in parallel.

The input data may provide consumption data at a given temporal resolution, for example daily, monthly or yearly. The analysis process may be repeated for different time periods. For example, where daily consumption data is available for the peers over a number of days, the analysis may be repeated for each day to generate a prediction for that day.

Data may be aggregated prior to the analysis or afterwards if the required temporal resolution for the output predictions is different from the temporal resolution of the input data. For example, daily data may be accumulated to provide monthly values, with the random forest prediction algorithm applied to the monthly values to generate monthly consumption predictions. Alternatively, daily predictions may be generated for multiple distinct days based on daily input data and subsequently accumulated to provide monthly predictions.

Output

The output of the above analysis algorithm is a predicted consumption value for the user based on the identified peer group for a given time period, or a set of such predicted consumption values (for different time periods). This output may be used to give a user an indication of expected consumption. Additionally, the system may compute expected costs based on the predicted consumption, by applying an energy charging rate or tariff to the predicted consumption value.

Furthermore, the predicted value may be compared to actual consumption values for the user, where such data is available, to give the user an indication of whether they are using more or less energy than similar households.

Figure 4:
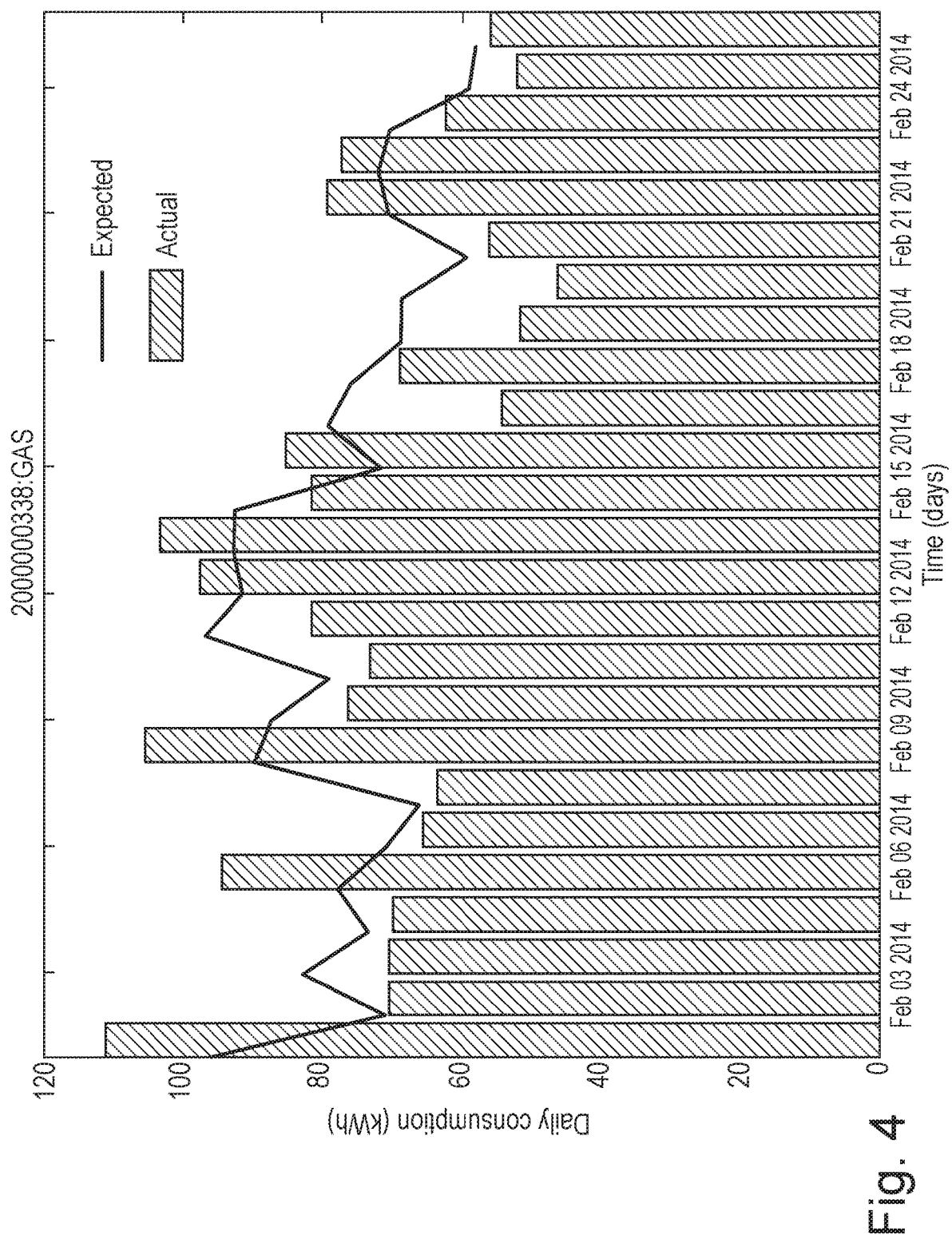
FIG. 4 illustrates output generated by the prediction algorithm.

The system preferably generates outputs in any suitable form, including textual form and graphical visualisations. An example of a graphical visualisation of a peer comparison is shown in FIG. 4. Here, a set of daily predicted consumption values for a target property have been calculated based on daily consumption data of the peer group over a given time period. In the graph, the predicted ("expected") values are indicated by the line graph, and the actual daily consumption values for the target property are indicated by the overlaid bar graph. This allows the user to compare the target property's consumption pattern to those of the peer group.

Further useful information may be derived based on the calculated predicted consumption data; for example an average or total consumption difference between the user and peer group over a given period (e.g. month or year) could be computed.

If the household uses multiple fuel types (typically gas and electricity), the above algorithm can be repeated for each fuel type to generate predicted consumption values for each fuel type. In that case, the prediction for a given fuel type is based on consumption data relating to that fuel type. The same peer group may be used for each fuel type prediction, or alternatively different peer groups may be selected for different fuel type predictions. Since different properties may use a different mix of fuel types (e.g. gas for heating only, or for heating and cooking), the prediction is preferably based only on peers having the same (or at least similar/comparable) fuel type usage pattern.

Figure 5:
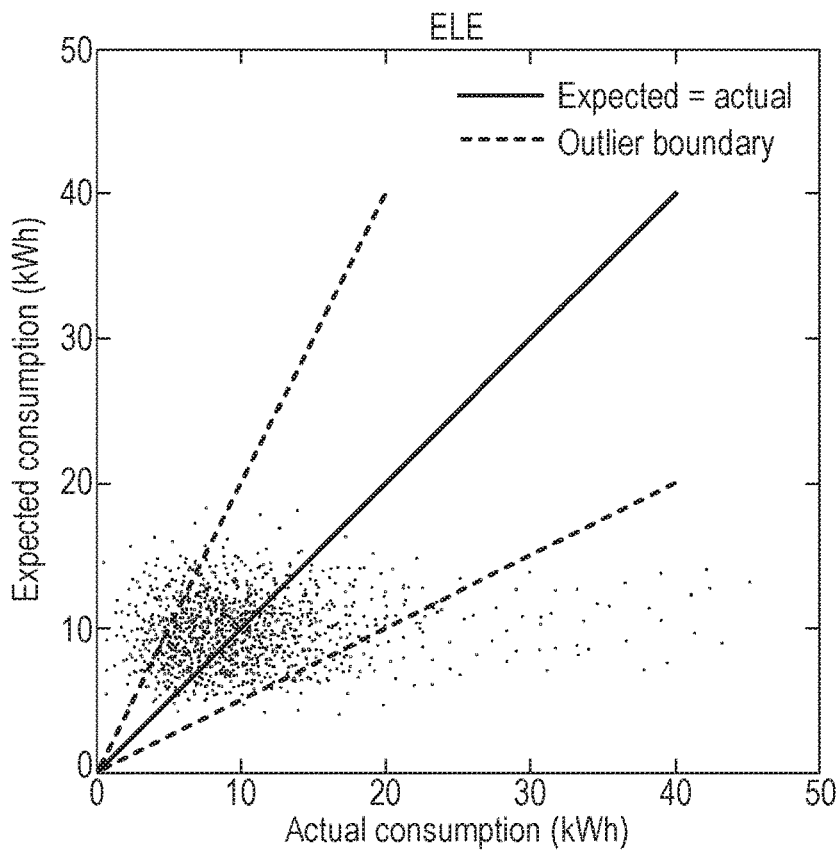
FIGS. 5 and 6 illustrate the accuracy of prediction results achieved by the algorithm.
Figure 6:
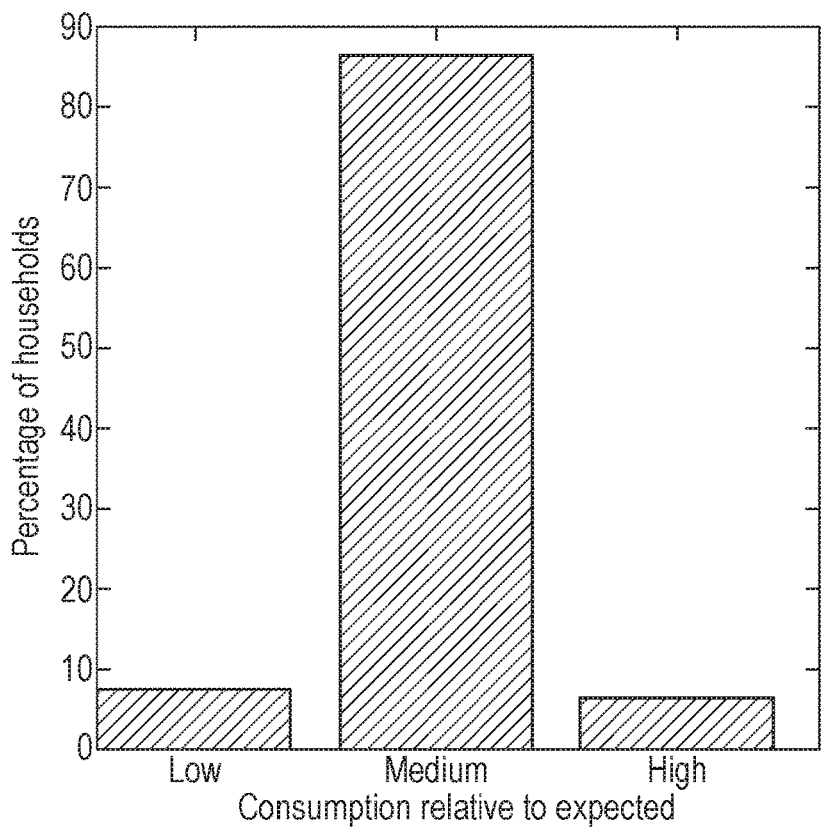

FIGS. 5 and 6 illustrate results of execution of the analysis algorithm for multiple test samples. FIG. 5 plots actual against expected consumption for a large number of samples and shows that the predicted consumption values are accurate on average (though outliers still exist). FIG. 6 illustrates the proportion of properties for which the prediction is lower than, close to, or higher than the expected consumption values, and shows that the predictions are close to the actual values for most properties.

Some bias issues can arise when insufficient representative data is available, for example, when there are insufficient candidate peers having particular extreme values for certain predictor attributes (e.g. having a large number of bedrooms). This can be alleviated by varying the number of peers selected. Furthermore, in some cases the predicted values over time show significantly more variation than the actual consumption values. This can be alleviated by varying the number of peers selected and removing outliers of consumption values from the training data.

Energy Breakdown Prediction

The above techniques may be adapted to provide a predicted breakdown of energy usage into a defined set of consumption categories. In one embodiment, energy usage is broken down into the following categories:

Heating
Hot water
Cooking (e.g. electric ovens, gas hobs etc.)
Large Appliances (e.g. fridges, washing machines etc.)
Entertainment (e.g. TVs, games consoles etc.)
Lighting The above categories are by way of example and other categories may be used.

For example, in regions where air conditioning is a significant component of domestic energy usage, a separate air conditioning (or cooling) category could be provided. In another example, heating and air conditioning/cooling could be combined in a single category (e.g. an environmental control category could be provided covering heating and air conditioning devices and possibly other environmental/climate management devices). Furthermore, the above categories could be subdivided in various ways (e.g. by placing washers and driers in a separate category from other large appliances). The heating category may cover only central heating (e.g. a gas boiler) or may cover additional heating systems such as electric radiators, underfloor heating and the like. In general, energy consumers may be assigned to categories in any suitable manner based on the specific circumstances and requirements.

In this example, instead of absolute consumption values as above, the consumption data used in training the prediction model comprises consumption breakdowns for sample properties into a given set of categories. The breakdowns may, for example, be specified as a set of percentage (or other fractional) values each indicating the proportion of energy usage by the property in question that falls within a given category.

An example of such input data samples is shown in FIG. 7. This is similar to the FIG. 2 example except, instead of a single consumption value, a set of consumption category values C1-C6 are associated with each entry, each specifying the proportion (or share) of a property's energy consumption that falls within the given category. In this example the value is given as a two-digit percentage for illustrative purposes, but in practice the value may be specified to any required level of accuracy. The values may represent the proportions of energy consumed directly in energy terms (e.g. share of total kWh usage) or in terms of associated cost/expenditure.

The data may represent a single fuel type (e.g. gas or electricity), and the algorithm may be run repeatedly for different fuel types to provide predicted breakdowns for each fuel type (which could then be combined into a total breakdown e.g. in terms of kWh or in cost terms). For example, assuming the data in FIG. 7 relates to the electricity fuel type, row 2 could represent a household that uses gas exclusively for environmental and water heating, and thus electricity makes no contribution to those categories. Note that different sets of categories may also be used for each fuel type.

Alternatively the values can represent usage proportions across multiple fuel types (e.g. in terms of proportions of a property's total energy usage in kWh terms or cost terms).

The learning algorithm used is similar to the one previously described, except in this embodiment, the Random Forest learning algorithm is executed separately for each category. For each category, a model is trained which relates the input predictor attributes P1-P4 to the consumption share for that particular category. The resulting prediction models are applied to the target property, again for each category, to calculate a set of category consumption values which are normalised to provide a final predicted breakdown.

While the learning algorithm could simply be run on the nearest N neighbours as in the previous example, the present example assumes that a total consumption value for the target property is known. The algorithm therefore instead selects as input samples for the learning algorithm the nearest N neighbours with similar total consumption, on the assumption that this indicates households with similar consumption needs and behaviour, allowing a more representative breakdown to be generated for the target property.

Figure 8:
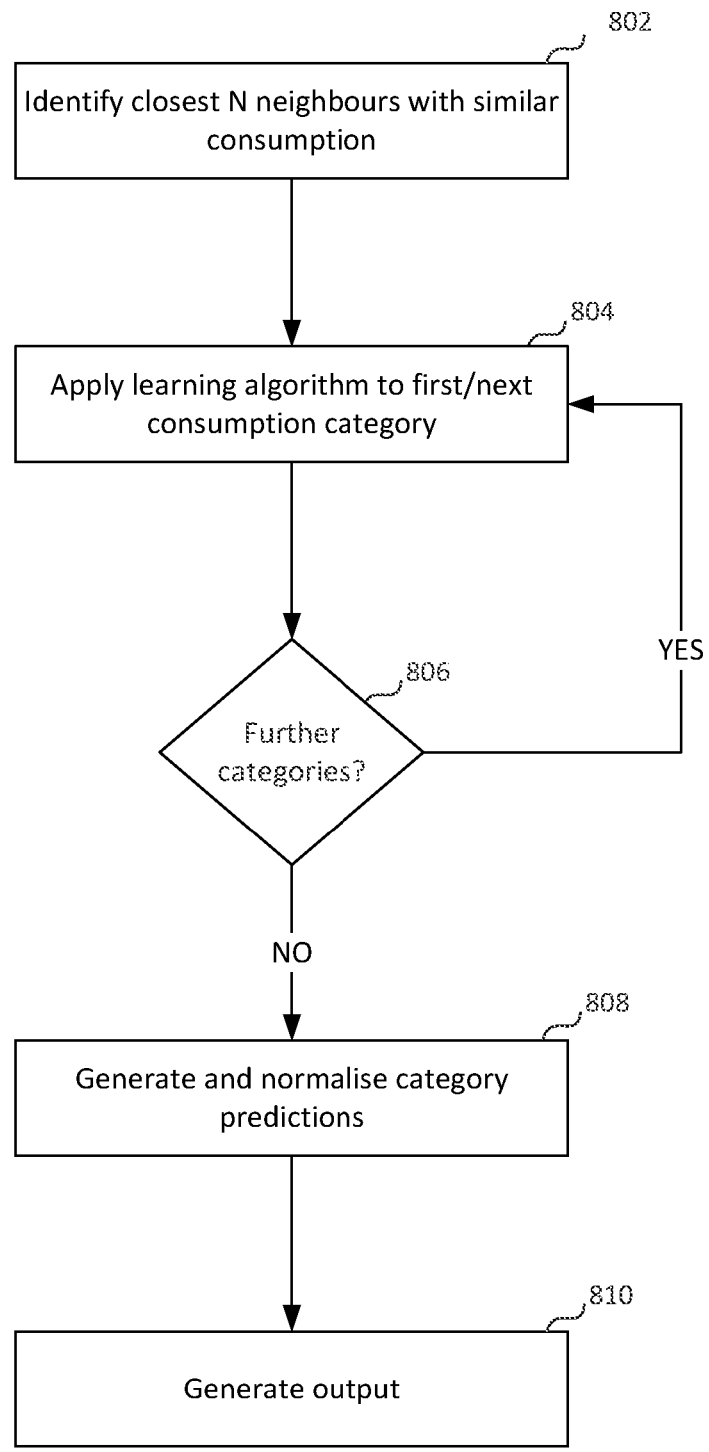
FIG. 8 illustrates a process of predicting energy consumption in various energy consumption categories.

The process is illustrated in FIG. 8.

In step 802, the set of N nearest neighbours having a similar total consumption to the household under consideration is determined. Similarity may be determined using any appropriate criteria, for example "similar" may mean within a given absolute or relative difference to the household under consideration (e.g. ±10 kWh or ±10%). Other factors may additionally or alternatively be used to select the samples used for the learning algorithm (such as selecting N nearest neighbours with a matching property type).

In step 804, the learning algorithm is applied to the selected training samples to create a prediction model for the first consumption category. The prediction model predicts a consumption share value for that category based on the predictor attributes (features) of the samples. Preferably the same random forest algorithm is applied as described previously (so that the prediction model comprises a set of decision trees trained based on randomized subsamples) though other regression techniques and learning techniques may be used.

In step 806 it is determined whether all categories have been processed. If there are further consumption categories to be analysed, the process continues to step 804 to learn a prediction model for the next category. If all categories have been analysed, the process continues to step 808.

In step 808, prediction values for each category are output based on the models learnt for the respective category. While the category values in the learning samples indicate a proportion or share of the total energy consumption falling into a given category and therefore sum (at least approximately) to one, the predicted values output by the decision trees will not necessary sum to one. The predictions are therefore normalised so that they sum to one or 100% (at least approximately; assuming the final values are rounded to a required level of precision they may not be required to sum exactly to one, though they could be adjusted to do so).

In step 810 output is generated based on the normalised category predictions. In one example the output stage may simply involve outputting the predicted category shares e.g. as percentage values of consumption. Alternatively, assuming a total consumption value is known or estimated (e.g. in kWh), the category shares may be applied to the consumption value to calculate actual or estimated consumption values (e.g. in kWh) in each category (by multiplying the total consumption by the predicted category share for each category).

In a further example, an energy cost may be determined for each category, based on the total consumption and the predicted category shares, and further based on a given charging rate or tariff.

The order and arrangement of processing steps in FIG. 8 is given by way of example, and the algorithm can be differently structured. For example, a prediction model may be built for one category and a category prediction generated using the model, before progressing to the next category. Category models and associated predictions may also be generated in parallel.

An example of an output screen is shown in FIG. 9. The output shows a consumption value expressed as an energy cost for each of the categories based on the output of the breakdown prediction. Note that in this example, an approximate cost range is determined and displayed for each category rather than a specific value (reflecting inherent uncertainties in the process). Ranges of percentage values (for relative predictions), kWh values (for absolute predictions) may be generated in a similar manner, and any other scale or unit for representing energy consumption may be used.

The display also shows (on the right, "Your home profile") the attribute values entered for the target property, which are used as predictive features by the prediction algorithm. The profile also shows the fuel types used by the household.

Figure 10:
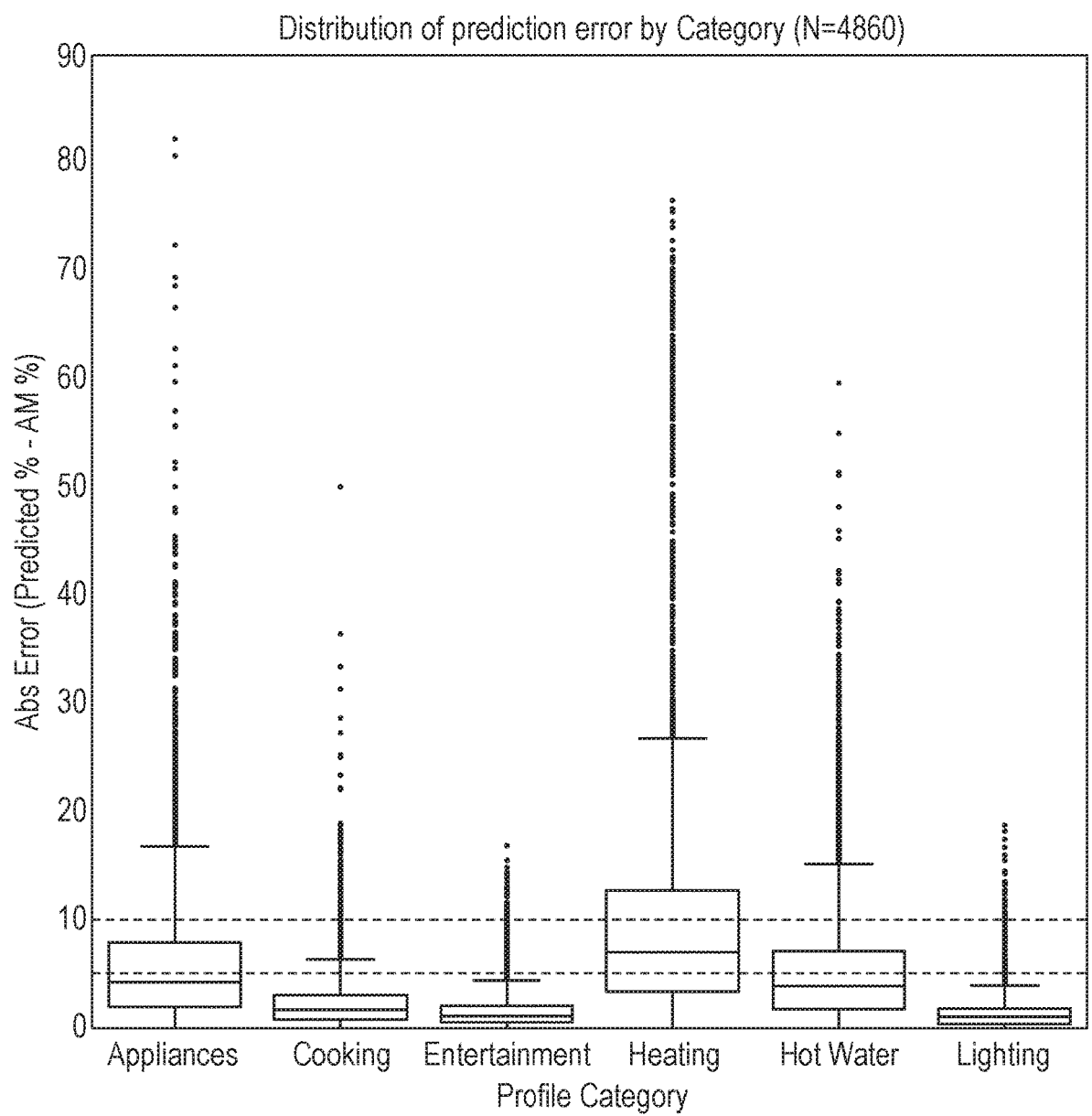
FIGS. 10 and 11 illustrate the accuracy of prediction results achieved by the algorithm.
Figure 11:
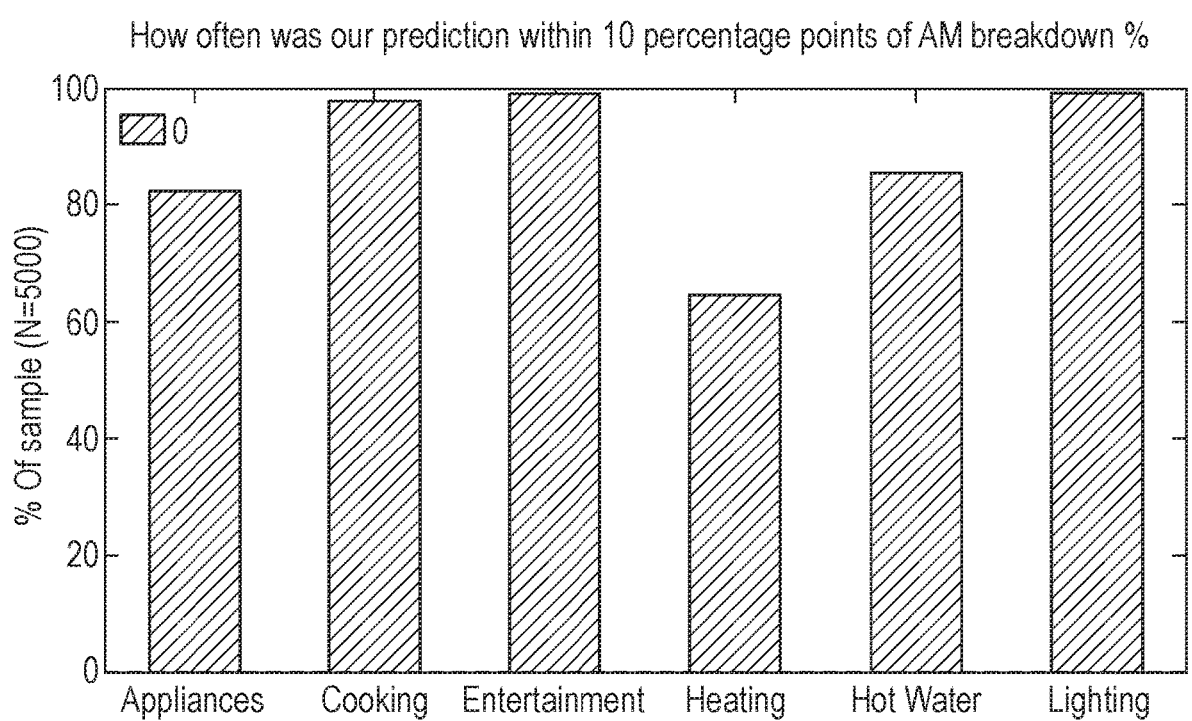

FIGS. 10 and 11 illustrate comparison of the predicted breakdowns output by the algorithm for a set of sample properties to known consumption breakdown data for those properties, where the known breakdown data is determined or estimated by other means (FIG. 10 illustrates the prediction error in each category and FIG. 11 illustrates the relative number of test samples for which the prediction in each category was within 10% of the actual consumption category value). The results show a high degree of accuracy of the predictions generated by the algorithm compared to directly obtained breakdowns.

As mentioned previously, the described process may be repeated for each fuel type used by the household. In one embodiment, only source samples relevant to the fuel types used by the household are considered. For example, for a household that uses gas for heating and hot water, and electricity for everything else, the algorithm is first run based on training samples for peers that also use gas for heating and hot water, and predictions are generated for the "heating" and "hot water" categories. The algorithm is then repeated for the "electricity" fuel type, and predictions are generated for the other categories. For each fuel type, the predictions give percentages for the relevant categories of the total amount of that fuel type consumed. Final output values can then be generated based on total known (or estimated) consumption values for the gas and electricity fuel types. In some categories (e.g. cooking) where both fuel types may be applicable, calculation of the final output (e.g. if expressed in cost terms) may involve combining individual predicted values for gas and electricity fuel types to generate a final value for that category.

As mentioned previously, the source samples used to train the model (as shown in FIG. 7) specify the breakdown of energy use by particular properties into the given categories. This information may be obtained via any appropriate techniques. For example analysis techniques based on direct measurement of appliance usage, disaggregation of an energy consumption signal, and/or use of national statistics and bill data, may be used as described in GB 2492071. Techniques based on direct measurement and/or disaggregation of an energy consumption signal may typically require frequent energy consumption readings (e.g. at least half-hourly readings, but preferably readings are taken more frequently, e.g. every minute or every 30 seconds, or even more frequently).

Analysis of such data can produce a reliable estimate of the energy breakdown into categories. However, such data is typically not available for all households (e.g. since many households are not equipped to provide frequent consumption readings due to not having suitable metering equipment installed).

The present prediction techniques can therefore be used to predict an energy breakdown for households for which no consumption data is available or for which the available consumption data is insufficient (in terms of time resolution and/or detail) for a direct breakdown determination. The algorithm predicts a consumption breakdown for such households based on consumption data for other households for which higher-quality consumption data (in terms of time resolution and/or detail) is available.

For example, many gas or electricity meters may provide only daily readings, or only provide data on demand when actively read (manually or electronically). Households with such meters may nevertheless be given an energy breakdown based on their known total consumption over a period, using the described prediction techniques.

Furthermore, even if no consumption data is available (e.g. because the household is not a current customer of the energy provider implementing the present system), the prediction techniques can be used based on an estimated total consumption or without any consumption data, by performing the peer selection without filtering based on total consumption.

Furthermore, the peer comparison and breakdown prediction techniques described above may also be combined, with a total consumption predicted using the first algorithm described above with reference to FIGS. 1-6, and the predicted consumption value then used as the total consumption value input to the breakdown prediction algorithm described with reference to FIGS. 7-11.

Consumption Profile Clustering

The described system may further provide functionality for analysing energy consumption data for different properties/households in order to identify behavioural patterns. A preferred embodiment aims to identify patterns of daily consumption, though other time intervals may be used as the basis for the analysis. The patterns are then used to group households by pattern similarity. This is achieved by clustering consumption profiles.

Figure 12:
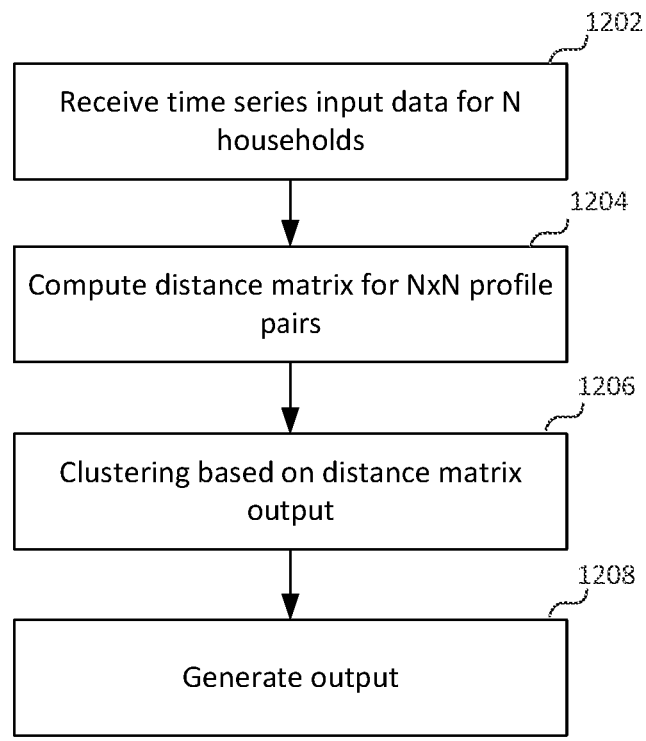
FIG. 12 illustrates a method of clustering energy consumption profiles.

The process is illustrated in FIG. 12.

In step 1202, input data is received, consisting of a time series of energy consumption values for each of a set of N households.

In this example, the time series data consists of half-hourly energy consumption values over a given time period this could be a day, a week, a month or any other time period. While raw consumption values could be used, to account for differences in overall consumption (that may not necessarily be indicative of different behaviour patterns per se), each half-hourly measurement of the time series may instead be expressed as a proportion (e.g. percentage) of the total consumption of that household for the period (e.g. day). This produces relative (rather than absolute) time series for each household that separate the pattern of consumption from the absolute consumption values. The time series are referred to herein as energy consumption profiles.

Figure 13:
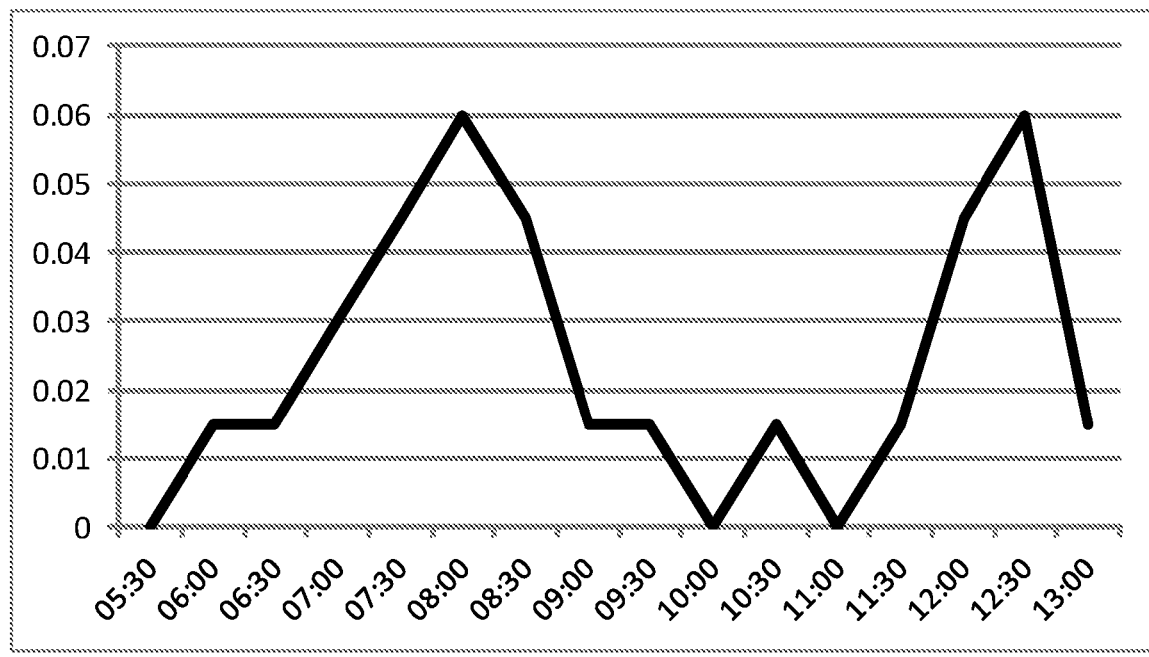
FIG. 13 illustrates a graph representation of a portion of an energy consumption profile.

A portion of an energy consumption profile is illustrated by way of example in FIG. 13. In this example, the time series has a half-hour temporal resolution, and the consumption is indicated as a percentage of the total consumption over the period covered by the profile (typically 24 hours, though here only an 8-hour excerpt is shown for clarity). Each data value in the time series indicates the total energy consumed in the half hour time interval preceding the sampling time.

Optionally, for each household, data for multiple periods may be averaged to produce an average time series for a measurement period. For example, multiple time series of half-hourly data each covering a respective day may be averaged (or otherwise combined) to produce a single representative time series for that household. The resulting averaged time series for different households are then used as the energy consumption profiles.

Returning to FIG. 12, in step 1204, pairwise comparisons are performed between the energy consumption profiles of respective households. Specifically, each profile is compared to each other profile and a distance function is computed for each profile pair. The distance function provides a measure of the extent to which the daily consumption curves of two households differ (or conversely, the extent of similarity between them). In a preferred embodiment, the distance function is based on a Pearson correlation (more specifically, the output value may be determined as one minus the Pearson correlation, which produces a distance measure instead of a similarity measure), though other distance/similarity/correlation functions/measures or comparison algorithms may be employed.

This step therefore produces an N x N matrix of distance values indicating correlation between any two input profiles. The profiles are then clustered based on similarity (step 1206), using the distance values. In a preferred embodiment, a k-medoids clustering algorithm such as PAM (partitioning around medoids) is used. PAM is preferred as it is suitable for use with distance metrics other than just Euclidean distance. The PAM algorithm is based on partitioning the dataset into clusters, in such a way that distances between points labelled as members of clusters and reference points for the clusters are minimized. The reference points define the cluster centres and in PAM are chosen as representative data samples (medoids). However, any suitable clustering algorithm may be used.

As a result of the clustering algorithm, the energy consumption profiles for households are clustered into a set of clusters, each cluster representing households having similar consumption profiles over the period under consideration (here a day). These clusters can therefore be interpreted as representing different types of consumption behaviour (e.g. lifestyle types).

In a preferred embodiment, the number of clusters produced by the algorithm can be controlled. It has been found that useful results are obtained by clustering into six clusters, though different numbers of clusters can be used.

In step 1208, an output is generated indicating the resulting clustering, which may include cluster assignments for specific households in the input sample set.

Figures 3, 14:
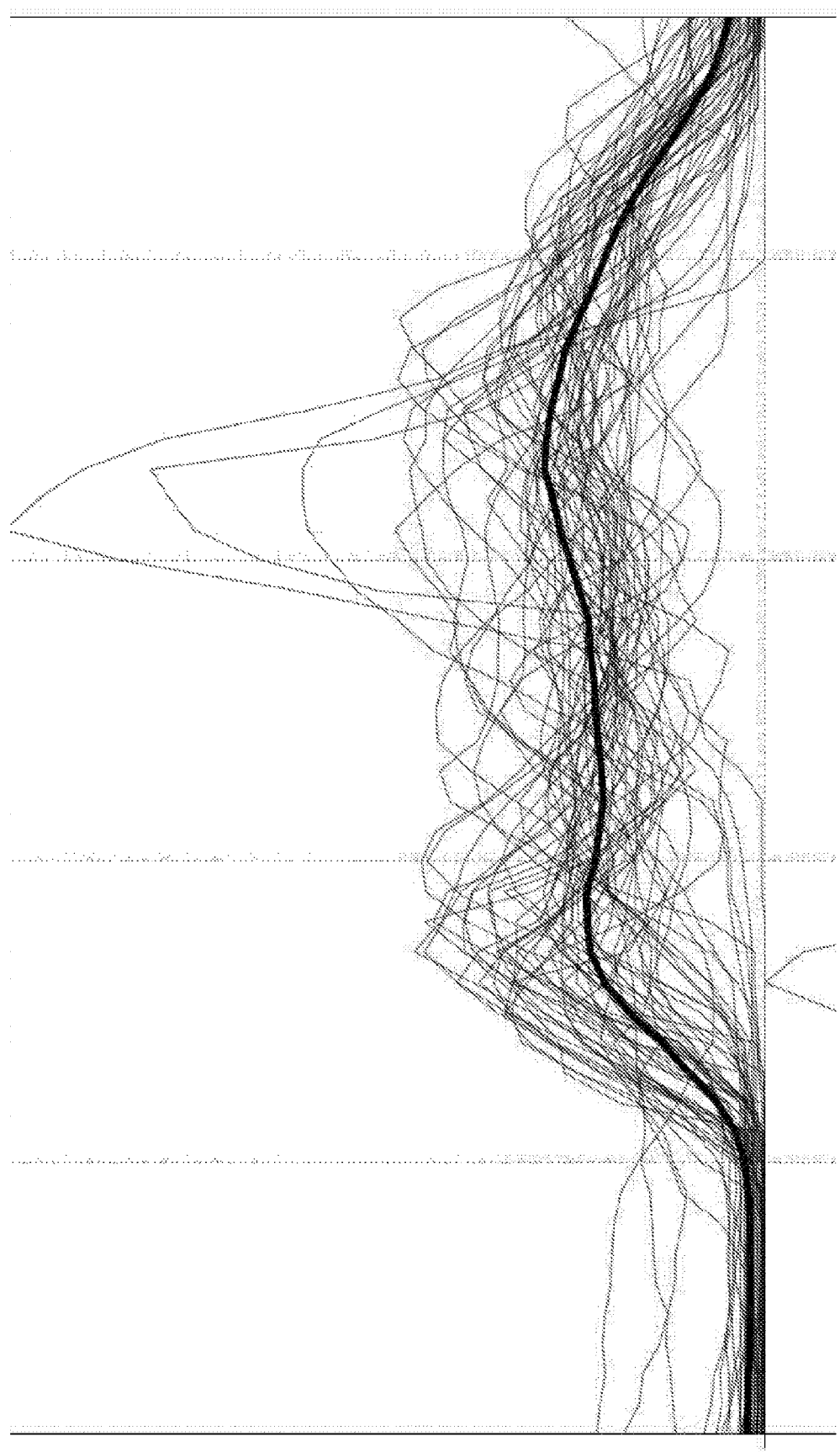
FIG. 14 illustrates an output of the clustering algorithm, broken down into four parts, 14-1, 14-2, 14-3, 14-4, that illustrate separate plotted graphs for the sake of clarity
Figures 4, 14:
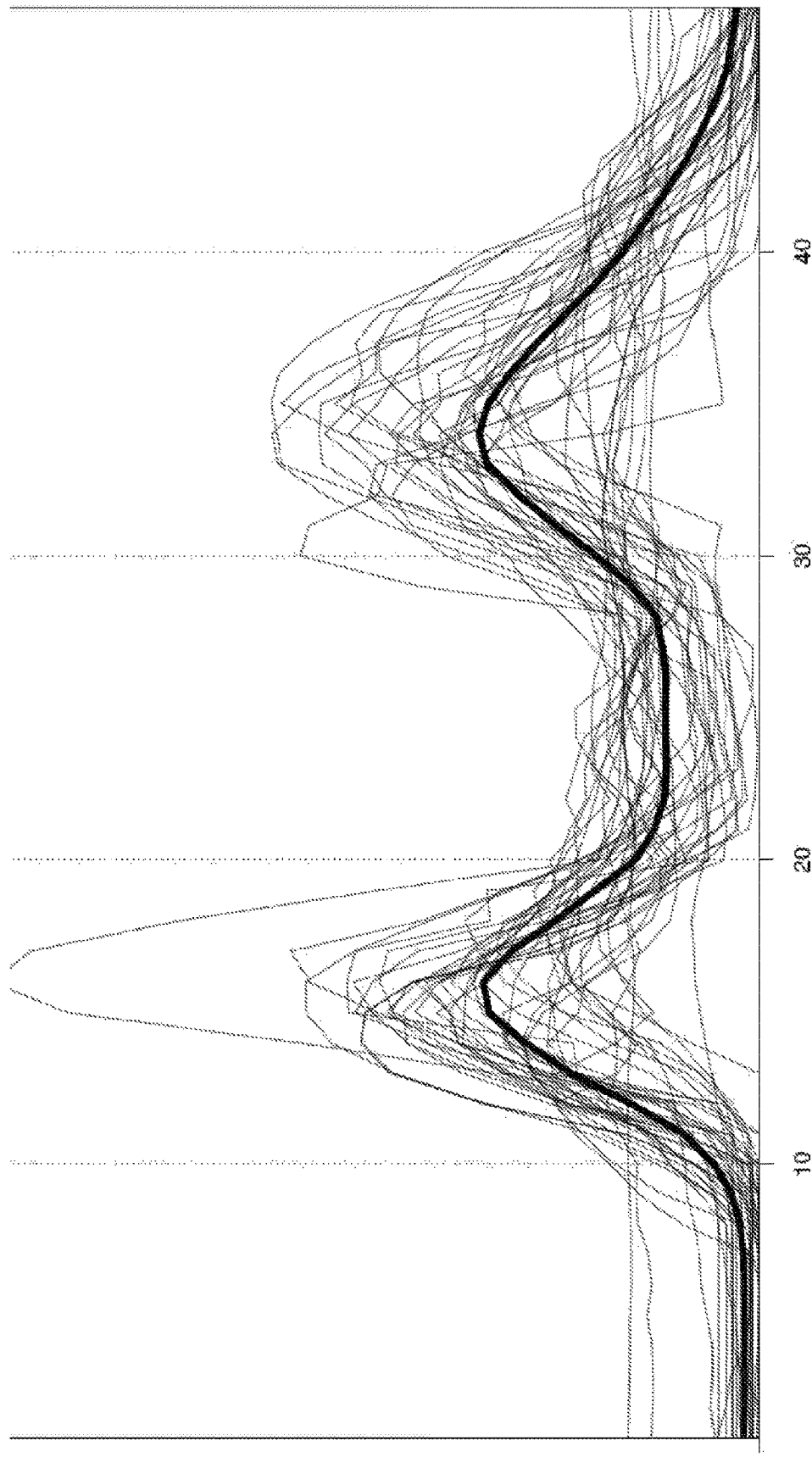

The clustering may also be visualised. An example visualisation is depicted in FIG. 14. This shows separate plots for each cluster. Each plot shows the actual profiles (lighter curves) with a medoid curve superimposed (in bold), the latter providing a representative profile for the cluster.

Once the clusters have been determined these can be used in further analysis. For example, an analysis can be performed to identify correlations between cluster assignment and property/household attributes (as used e.g. as predictive features in the prediction algorithms previously described). When such an analysis was performed, no correlation was observed between the cluster assignment and any of the following attributes: number of occupants; number of bedrooms; house type; house age band. This lack of correlation indicates that the clustering is indeed representative of different lifestyle classes rather than more fundamental property attributes.

Once the clusters have been identified, new (previously unseen) profiles may also later be assigned to determined clusters and hence behaviour patterns. For example, behavioural changes may be identified if new data for a customer indicates a different cluster membership to a previously assigned cluster. Cluster assignments may also be used e.g. to improve tariff recommendations and to provide recommendations to energy customers for reducing their energy consumption.

As mentioned previously, the clustering algorithm may operate on input data covering a specific time period (e.g. day), or time series data for multiple time periods may be combined (e.g. averaged) to produce a representative time series for a household as input to the clustering algorithm. As an example data for weekdays (Monday-Friday) may be combined and clustered to produce a clustering indicative of weekday behaviour patterns, and data for weekend days may be combined to produce a clustering indicative of weekend behaviour patterns.

As a further variation, the algorithm may be run repeatedly on time series data for respective different time periods, and the clustering results obtained for different time periods may then be combined subsequently.

For example, data for individual specific days may be clustered to determine day-specific behaviour clusters (e.g. a clustering could be performed separately for each day from 1 Jul. 2015 to 31 Jul. 2015). The resulting clustering for individual dates may then be combined to determine behaviour patterns over a longer period (for example to generate a single clustering for July 2015). In one approach, this may be done by performing a second level of clustering, using a similar algorithm as described above, to cluster individual day behaviour patterns into behaviour patterns representative of behavioural variations and patterns over a longer period (e.g. a month).

In the algorithm described above, N×N comparisons are performed for N input samples. This is feasible for smaller sample sizes (e.g. a typical sample size used during evaluation of the algorithm was N=1000). However, this approach may not scale to much larger input sample sizes. In such cases the algorithm can be adapted to improve efficiency. In one such approach, clustering is based on a subsample of the input samples. Once clusters have been determined based on the subset, cluster memberships for other input samples can then be determined, e.g. by determining their distance (in terms of the distance function) to a determined cluster centre or a chosen representative sample of the cluster (e.g. the medoid as used in the clustering). The quality of the clustering can also be determined at this stage and if necessary the clustering can be rerun with a different input subsample and/or different subsample size until the clustering reaches a required quality.

System Architecture

Figure 15:
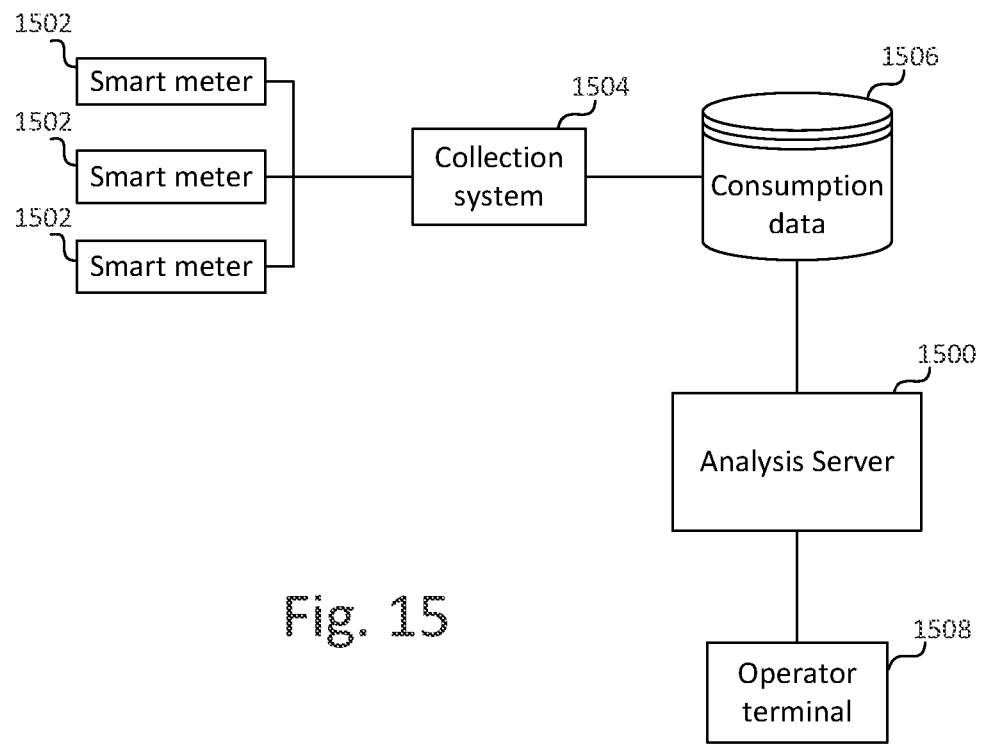
FIG. 15 illustrates a system for performing the described analysis and prediction processes.

FIG. 15 illustrates a computer system arranged to carry out the analysis processes described above.

The system includes an analysis server 1500 for performing data analysis. Energy consumption data is obtained from smart meters 1502 installed in residential properties by a collection system 1504 and stored in a consumption data database 1506. The consumption data is augmented with property attribute data (e.g. for use as predictive features in the learning algorithms). For example, this may be entered by an operator, or by an energy customer themselves, e.g. using a web portal. The consumption data in the database is typically also collected and stored for purposes other than analysis (e.g. billing, diagnostics etc.).

While a single database is shown for illustration, in practice the data samples used by the analysis server may be extracted from another database (e.g. a database of customer information stored by an energy provider). Data may also be imported from various different sources to produce the training samples used by the system.

The analysis server 1500 retrieves consumption data from the database and performs the peer comparison, energy breakdown prediction and clustering algorithms described above, under control of an operator/user interacting with the system via an operator terminal 1508. For example, the operator may control algorithm parameters such as the number of peers to use in the peer comparison algorithm or the total (estimated) energy consumption of the target household in the energy breakdown algorithm. Generated output may similarly be provided to the operator at the operator terminal. For example, operator/user interaction may be via a web application.

The components shown in FIG. 15 may communicate over any suitable networks, including the Internet.

Figure 16:
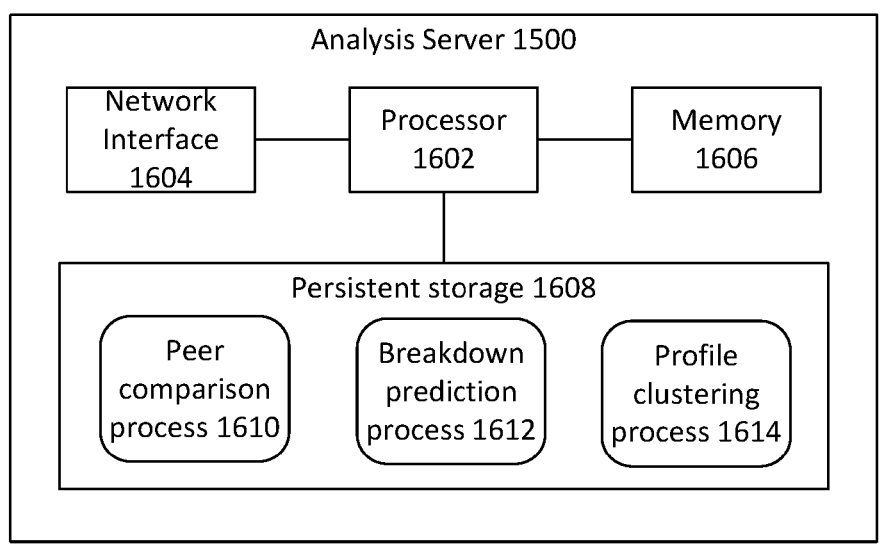
FIG. 16 depicts the architecture of an analysis server adapted to perform the described analysis and prediction processes.

FIG. 16 illustrates the hardware architecture of the analysis server 1500. The server includes one or more processors 1602 together with volatile/random access memory 1606 for storing temporary data and software code being executed.

A network interface 1604 is provided for communication with other system components (e.g. database 1506 and operator terminal 1508) over one or more networks (e.g. Local or Wide Area Networks, including the Internet).

Persistent storage 1608 (e.g. in the form of hard disk storage, optical storage and the like) persistently stores analysis software for performing the analysis functions, including a peer comparison process 1610, breakdown prediction process 1612 and clustering process 1614. The persistent storage also includes other server software and data (not shown), such as a server operating system.

The server will include other conventional hardware and software components as known to those skilled in the art, and the components are interconnected by a data bus (this may in practice consist of several distinct buses such as a memory bus and I/O bus).

While a specific architecture is shown by way of example, any appropriate hardware/software architecture may be employed.

Furthermore, functional components indicated as separate may be combined and vice versa. For example, the database 1506 may be stored at the server 1500 (e.g. in persistent storage 1608) or may be provided as a separate database server. Furthermore, the functions of server 1500 may in practice be implemented by multiple separate server devices.

It will be understood that the present invention has been described above purely by way of example, and modification of detail can be made within the scope of the invention.

The invention claimed is:

1. A computer-implemented method of generating predicted energy consumption data for a first energy consumer based on energy consumption data of a plurality of further energy consumers, comprising collecting energy
   consumption data from meters associated with energy consumers, storing the eneray
   consumption data in a database and processing the data by a process including: obtaining a total consumption value for the first energy consumer;
   accessing a set of training samples, each training sample comprising predictor attribute data and energy consumption data for a respective one of the further energy consumers, the energy consumption data comprising consumption category values for energy consumption in each of a predetermined set of energy consumption categories, the categories indicating different classes of energy consuming devices;
   generating a predictive model based on the training samples, the predictive model defining a relationship between values of predictor attributes and energy consumption data of the training samples, wherein generating a predictive model comprising running a machine learning algorithm for each of the energy consumption categories, each iteration generating a respective category prediction model for the respective energy consumption category based on the category consumption values for the respective energy consumption category in the training samples;

receiving one or more predictor attribute values for the first energy consumer;

determining predicted energy consumption data for the first energy consumer using the predictive model and the received predictor attribute values, the determining step including generating predicted consumption category values for a plurality of the energy consumption categories for the first energy consumer based on the generated category prediction models and the total consumption value for the first energy consumer; and outputting the predicted energy consumption data including the predicted consumption category values.

2. The method according to claim 1,
wherein, the category values specify a proportion of a total energy consumption value associated with the respective energy consumer that falls in the respective consumption category.

3. The method according to claim 2,
wherein, each predicted consumption category value indicates a proportion of a total consumption predicted to fall within the respective consumption category.

4. The method according to claim 3, further comprising determining based on the proportional category values and total consumption value for the first energy consumer predicted absolute category consumption values for the first energy consumer for one or more of the categories.

5. The method according to claim 1, wherein the energy consumption categories of include one or more of: an environmental heating category, an air conditioning/cooling category, a climate control category, a water heating category, a cooking category, an appliances category, a lighting category and an entertainment device category.

6. The method according to claim 1, wherein generating a the predictive model comprises generating one or more decision trees based on the training samples, the one or more decision trees adapted to produce predicted energy consumption data based on one or more predictor attribute values of an unseen sample.

7. The method according to claim 6, the step of generating each cateaory prediction model comprising: generating a plurality of decision trees, each decision tree learnt from a subset of the data of the training samples, the data subset preferably determined by random selection of a set of samples from the training samples and/or by random selection of predictor attributes from predictor attributes of the training samples, and wherein determining predicted energv consumption data comprises: generating a plurality of prediction outputs based on the plurality of decision trees; and generating the predicted energy consumption data based on the plurality of prediction outputs.

8. The method according to claim 1, wherein the received predictor attribute values for the first energy consumer and/or the predictor attribute data of the training samples comprise one or more of:
a property type attribute;
a property age attribute;
a property size attribute, optionally indicating a number of rooms or a number of bedrooms of a residential property;
an occupancy attribute indicating a number of occupants of the property.

9. The method according to claim 1, wherein accessing a set of training samples comprises selecting the set of training samples from samples in the database based on one or more predetermined criteria.

10. The method according to claim 9, comprising selecting the training samples based on a geographic distance between energy consumers represented by the training samples and the first energy consumer, preferably by selecting a predetermined number of training samples of energy consumers that are geographically nearest the first energy consumer.

11. The method according to claim 9, comprising selecting training samples for energy consumers having a similar total energy consumption to the first energy consumer, preferably having a total energy consumption value within a predetermined threshold distance from a total energy consumption value of the first energy consumer.

12. The method according to claim 1, comprising generating predicted energy consumption data for each of a plurality of time periods and/or for each of a plurality of fuel types, optionally by repeating the model generating and prediction determining steps using respective sets of training samples for each of the time periods and/or fuel types.

13. The method according to claim 1, wherein the outputting step comprises generating and outputting a comparison between predicted energy consumption data for the first energy consumer and actual energy consumption data for the first energy consumer, preferably in the form of a graphical representation (optionally a graph).

14. A non-transitory computer readable medium comprising software code for generating predicted energy consumption data for a first energy consumer based on energy consumption data of a plurality of further energy consumers, the software code configured to perform operations including fer: collecting energy consumption data from meters associated with energy consumers; storing the energy consumption data in a database; processing the data a process including; obtaining a total consumption value for the first energy consumer; accessing a set of training samples, each training sample comprising predictor attribute data and energy consumption data for a respective one of the further energy consumers, the energy consumption data comprising consumption category values for energy consumption in each of a predetermined set of energy consumption categories, the categories indicating different classes of energy consuming devices; generating a predictive model based on the training samples, the predictive model defining a relationship between values, of predictor attributes and energy consumption data of the training samples, wherein generating a predictive model comprising running a machine learning algorithm for each of the energy consumption categories, each iteration generating a respective category prediction model for the respective energy consumption category based on the category consumption values for the respective energy consumption category in the training samples;

receiving more predictor attribute values for the first energy consumer, and determining predicted energy consumption data for the first energy consumer using the predictive model and the received predictor attribute values, the determining step including generating predicted consumption category values for a plurality of the energy consumption categories for the first energy consumer based on the generated category prediction models and the total consumption value for the first energy consumer, and outputting, the predicted energy consumption data including the predicted consumption category values.

15. A system for generating predicted energy consumption data for a first energy consumer based on energy consumption data of a plurality of further energy consumers, the system comprising a processor with associated memory, the system operably predictor consumer collects energy consumption data from meters associated with energy consumers; stores the energy consumption data in a database; processes the data by a process including: obtaining a total consumption value for the first energy consumer: accessing a set of training samples, each training sample comprising predictor attribute data and energy consumption data for a respective one of the further energy consumers, the energy consumption data comprising consumption category values for energy consumption in each of a predetermined set of energy consumption categories, the categories indicating different classes of energy consuming devices; generating a predictive model based on the training samples, the predictive model defining a relationship between values of predictor attributes and energy consumption data of the training samples, wherein generating a predictive model comprising running a machine learning algorithm for each of the energy consumption categories, each iteration generating a respective category prediction model for the respective enemy consumption category based on the category consumption values for the respective energy consumption category in the training samples; receiving one or more predictor attribute values for the first energy consumer, and determining predicted energy consumption data for the first energy consumer using the predictive model and the received predictor attribute values, the determining step including generating predicted consumption category values fora plurality of the energy consumption categories for the first energy consumer based on the generated category prediction models and the total consumption value for the first energy consumer, and outputs the predicted energy consumption data including the predicted consumption category values.

16. The method of claim 1, wherein the one or more predictor attribute values for the first energy consumer are received from a user via a web application interface, wherein the outputting step comprises outputting via the web application interface an energy consumption breakdown, the energy consumption breakdown displaying a breakdown of energy consumption for the first energy consumer into the predetermined set of energy consumption categories based on the predicted consumption category values for each energy consumption category.

17. The method of claim 16, further comprising outputting via the web application interface energy savings recommendations for each energy consumption category.

* * * * *